UNITED STATES PATENT OFFICE 2,547,123

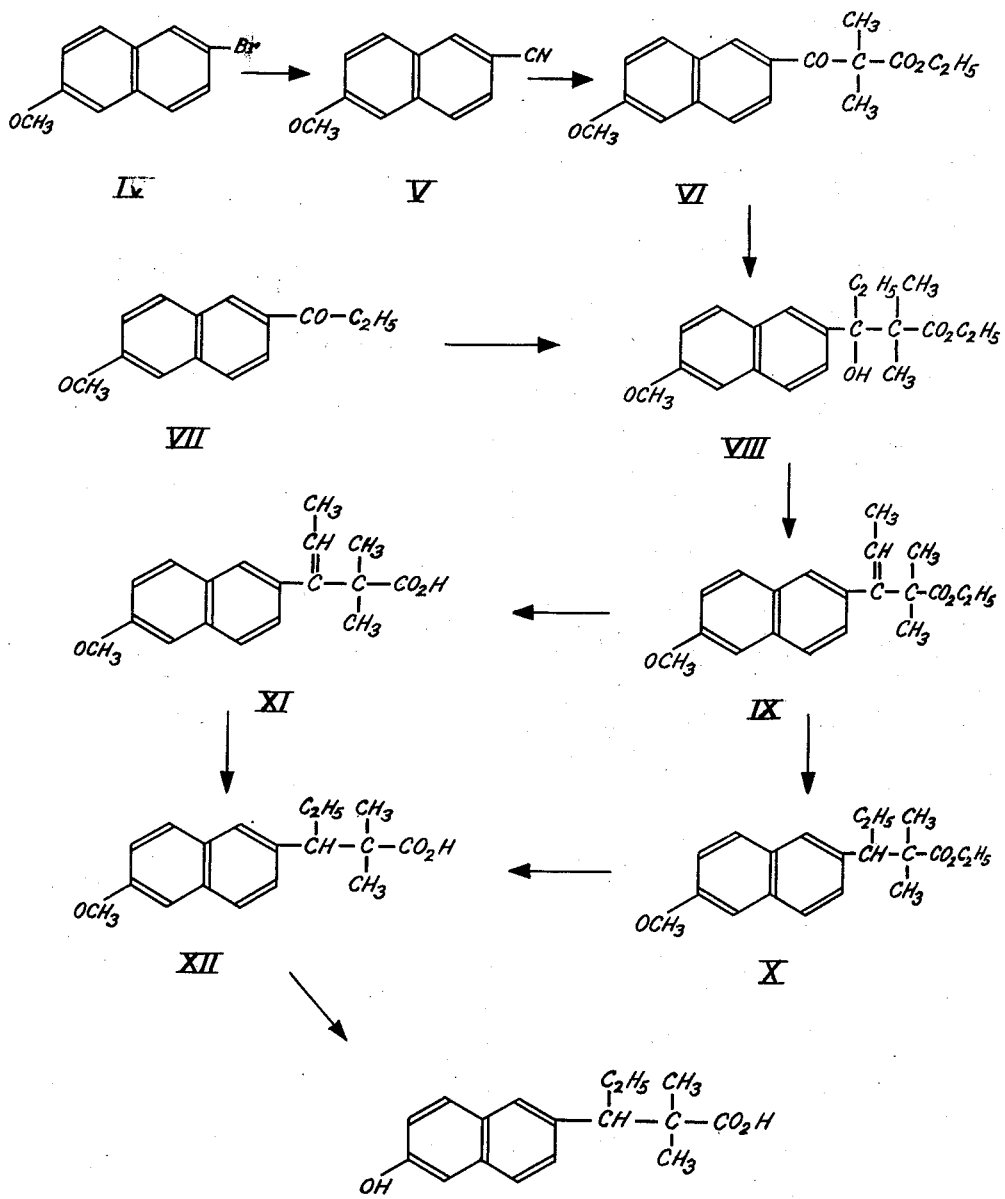

PROCESSES FOR PREPARING ARTIFICIAL OESTROGENIC COMPOUNDS AND PRODUCTS OBTAINED THEREBY

Alain Horeau, Sceaux, and Jean Jacques, Paris, France

Application February 20, 1948, Serial No. 9,926
In France March 6, 1947

9 Claims. (Cl. 260—520)

It is known that the artificial oestrogenic compounds heretofore used may be divided into three broad categories, viz, the stilbene derivatives or their hydrogenation products, the diphenylpropane derivatives, and the substituted tetrahydrophenanthrene acids. These compounds have met with considerable success, since their preparation is much easier than the extraction of natural hormones from the urine of pregnant mares, which was the previous practice. These artificial oestrogenic compounds are of variable degrees of activity.

The present invention has chiefly for its object a process for preparing oestrogenic substances of the following general Formula I:

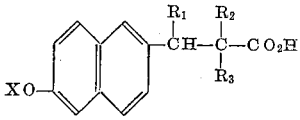

wherein X represents hydrogen or a methyl or ethyl radical, $R_1$, $R_2$, $R_3$ representing methyl or ethyl radicals.

The invention also has for its object, by way of new industrial products, the substances prepared by means of the said process.

The substances corresponding to Formula I are artificial oestrogenic compounds of variable degrees of activity, some of which are particularly powerful and, acting either subcutaneously, or internally, can replace the natural oestrogenic hormones for all the applications thereof.

The process for preparing substances of the above mentioned structure comprises reacting zinc—or other metallic—derivatives of brominated esters with 2-6 substituted naphthalene derivatives.

According to one embodiment, one of the substituents is a cyano group.

According to a modification, one of the substituents is an aldehyde or ketone group.

A description of the application of the process to the preparation of [3-(6-hydroxy-2-naphthyl)]2,2-dimethyl-pentanoic acid is given hereunder.

Reference will be made to the accompanying drawing which shows the linking up of the reactions described hereinafter.

Example I

Preparation of the above substance from a 2-6 naphthalene derivative containing a cyano group.

The starting substance is the known 2-bromo-6-methoxy-naphthalene (IV in the drawing), which is converted into 2-cyano-6-methoxy-naphthalene (V).

In order to do this, 90 g. of 2-bromo-6-methoxy-naphthalene (IV) are heated with 60 g. of cuprous cyanide in a metal bath at 240-250° C. stirring for one hour. At the instant when the cuprous cyanide begins to react and dissolves, the mass turns brown, liquefies and heats up strongly. The molten mass is poured onto a cold surface, is pulverized and sifted. This powder is treated with dilute ammonia (1 litre of water to 300 cc. of commercial ammonia solution). The solution is filtered on a Büchner filter and the precipitate that remains on the filter is washed with dilute ammonia and then with water. After drying, the residue is treated in a Kumagawa extracting apparatus with boiling benzene. The benzene is evaporated and the residue is distilled in vacuo. About 50 g. of cyanonerolin ($E_{14\,mm.}$=205-208° C.) are obtained with a yield of about 70%. By recrystallization in 200 cc. of methyl alcohol, 40 g. of the product (V) are obtained in an absolutely pure state, in the shape of beautiful colourless needles ($F$=103° C. with the Maquene block). By concentrating the mother liquor to half its original volume, a further 3.6 g. of pure product are obtained. Analysis shows:

|  | Per Cent |
|---|---|
| Calculated for $C_{15}H_9ON$ | N=7.65 |
| Found | N=7.55 |

The 2-cyano-6-methoxy-naphthalene (V) is in turn converted by successive reactions:

a. Into beta-ketonic ester
b. Into ester-alcohol
c. Into beta-ethylene ester by dehydration
d. Into saturated ester
e. Into [3-(6-methoxy-2-naphthyl)] 2,2-dimethyl pentanoic acid
f. Into [3-(6-hydroxy-2-naphthyl)] 2,2-dimethyl pentanoic acid which is the required product.

a. Obtaining a beta-ketonic ester by reacting ethyl bromoisobutyrate with cyanonerolin.

9 g. of cyanonerolin are heated in a reflux apparatus for 40 minutes with 7 g. of zinc and 19 g. of ethyl bromo-isobutyrate in the presence of 150 cc. of anhydrous benzene. After cooling, the mixture is filtered to eliminate unreacted zinc and is hydrolysed by stirring for one hour with dilute sulphuric acid (10 cc. of sulphuric acid to 200 cc. of water). The benzene layer is washed, dried and the solvent is eliminated. It is purified by recrystallization in methyl alcohol. 12.5 g. of ketonic ester (VI) $F=72.5-73.5°$ C.) are thus obtained in the form of large prismatic crystals. Analysis shows:

Calculated for $C_{18}H_{20}O_4$ ----- C=72.00 H=6.66
Found -------------------- C=72.10 H=6.75 b. Obtaining an ester-alcohol by reacting magnesium ethyl bromide with the previous ketonic ester.

10 g. of the previous ester dissolved in 40 cc. of anhydrous benzene are gradually poured while stirring into an iced solution of magnesium ethyl bromide prepared from 1.035 g. of magnesium, 4.15 cc. of ethyl bromide and 40 cc. of anhydrous ether. After heating in a reflux apparatus for half an hour, the mixture is poured into ice in the presence of ammonium chloride. After washing the ether-benzene layer, the solvents are eliminated in vacuo and an ester-alcohol (VIII) is thus obtained with a yield of 98%, in the form of a transparent resin. This resin, if treated with petroleum ether, yields 6.35 g. of ester-alcohol in the form of fine needles $F=66.68°$ C.) which are very soluble in the chief organic solvents and in petroleum ether. Analysis shows:

Calculated for $C_{20}H_{24}O_4$ ----- C=72.70 H=7.93
Found -------------------- C=72.77 H=7.77 c. Conversion into ethyl [3-(6-methoxy-2-naphthyl)] 2,2 dimethyl-3-pentanoate by dehydrating the previous ester-alcohol (VIII).

The semi-oily raw product of the previous reaction is dehydrated by heating with its own weight of potassium disulphate to 180° C. until boiling stops. After cooling, the magma is removed from the anhydrous ether in small portions. The ether is then evaporated and an ethylene ester (IX) is obtained in the form of an oil which slowly solidifies, with a yield of 93%. The product, after being purified by chromatography, melts at 48–51° C. Analysis shows:

Calculated for $C_{20}H_{24}O_3$ ----- C=76.89 H=7.74
Found -------------------- C=77.07 H=7.59 d. Obtaining ethyl [3-(6-methoxy-2-naphthyl)] 2,2-dimethyl pentanoate by hydrogenation of the previous ethylene ester.

3.5 g. of the previous ethylene ester, purified by chromatography, are hydrogenated in the presence of 3.6 g. of platinum in 30 cc. of ether. The quantity of hydrogen fixed corresponds to the theoretical quantity calculated. After filtering, the ether is evaporated, 3.45 of ester (X) are thus obtained in the form of an oil which quickly solidifies. Purification is effected by chromatography. Analysis shows:

Calculated for $C_{20}H_{26}O_3$ ----- C=76.40 H=8.32
Found -------------------- C=76.31 H=8.08 e. Obtaining [3-(6-methoxy-2-naphthyl)] 2,2 dimethyl pentanoic acid (XII).

2.5 g. of the previous ester are saponified by means of 15 cc. of soda lye and 25 cc. of methyl glycol. The mixture is boiled for one hour, diluted with water and, after cooling, is treated twice with ether in order to eliminate the remaining neutral fractions. The aqueous layer is precipitated by means of 15 cc. of acetic acid. 2.1 g. of raw acid (XII) are obtained. After effecting two crystallizations in 10 parts of acetic acid mixed with 3 parts of water, fine needles are obtained which are grouped in rosettes and melt at 131.5–132.5° C. Analysis shows:

Calculated for $C_{18}H_{22}O_3$ ----- C=75.49 H=7.75
Found -------------------- C=75.83 H=7.57 f. Demethoxylation of the previous acid.

Demethoxylation is effected by heating to 190° C. with pyridine hydrochloride, and after the usual known treatments, the desired phenol-acid viz: [3-(6-hydroxy-2-naphthyl)]2,2 - dimethyl pentanoic acid (XIII) is obtained which, after being recrystallized in benzene and then dried in vacuo, melts at 170.5–171° C. Analysis shows:

Calculated for $C_{18}H_{22}O_3$ ----- C=75.49 H=16.65
Found -------------------- C=75.83 H= 7.57

*Example II*

As hereinbefore stated, instead of starting from 2-bromo-6-methoxy-naphthalene, use is made of 2-methoxy-6-propionyl naphthalene (VII) as a starting material. In this case, 10.7 g. of 2-methoxy-6-propionyl naphthalene (VII) is reacted with 7.5 cc. of ethyl bromoisobutyrate, 3.3 g. of zinc and 60 cc. of benzene under the conditions of Reformatzky's reaction. The mixture is heated in a reflux apparatus for 1 hour and a half reckoned from the instant when the reaction starts. Then, after cooling, the reaction mass is filtered in order to eliminate the residual zinc and hydrolysed by means of dilute sulphuric acid. The benzene layer is collected and washed with water, then the solvent is eliminated as completely as possible. 12 g. of the raw ester-alcohol (VIII) thus obtained are then directly dehydrated by boiling for half an hour with 25 cc. of formic acid.

After having driven off the formic acid, the ethyl ester thus obtained can be purified and the previously described operations effected.

*Example III*

In either of the two foregoing examples, instead of hydrogenating the ethylene ester (IX) to obtain the ester (X) which is then saponified to obtain the acid XII, it is also possible, by saponifying the ester (IX) to prepare the ethylene acid: [3-(6-methoxy-2-naphthyl)]2,2-dimethyl-3-pentanoic acid (XI) which is then converted into acid (XII) by hydrogenation, acid (XII) then being demethoxylated in order to obtain acid (XIII), as hereinbefore described.

The [3-(6-hydroxy-2-naphthyl)]2,2-dimethyl pentanoic acid obtained according to the invention is a remarkably active oestrogenic compound; a single injection of the order of a fraction of gamma to a castrated female rat proves to be active.

Naturally, the invention is in no way limited to the embodiments hereinbefore described which have only been given by way of examples. It also applies to all the compounds corresponding to Formula I and to the preparation of such compounds. The process for preparing them is moreover capable of being subjected to a few changes in the order of carrying out the operations.

Having now described our invention, what we claim as new and desire to secure by Letters Patent is:

1. A process of preparing oestrogenic compounds of general formula:

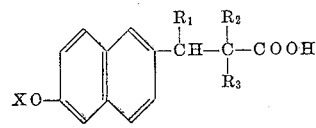

which comprises subjecting to dehydration an alcohol of the general formula:

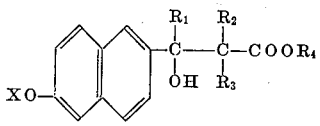

to form an ethylenic derivative of the general formula:

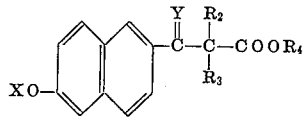

the letter X in said general formulae representing a member of the group consisting of hydrogen and alkyl radicals of less than three carbon atoms, Y representing an ethylenic residue of less than three carbon atoms, $R_1 R_2 R_3$ representing the alkyl radicals of less than three carbon atoms and $R_4$ an alkyl radical, hydrogenating said ethylenic derivative and saponifying the ester group $COOR_4$.

2. A process as claimed in claim 1, which consists in preparing the alcohol used as a starting material by treating the corresponding beta-keto-ester by means of a magnesium-organic compound.

3. A process as claimed in claim 1, wherein the saponification of the ester group $COOR_4$ is effected by means of a caustic soda solution containing methylglycol.

4. A process as claimed in claim 1, wherein dealkylation is effected by heating with pyridine hydrochloride.

5. A process as claimed in claim 1, which consists in preparing the alcohol which is subjected to dehydration by treating a substituted naphthalene of the general formula:

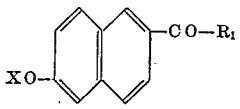

by means of a metal organic derivative of a a brominated ester of the general formula:

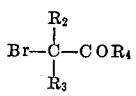

in which X, $R_1$, $R_2$ and $R_3$ have the same meaning as in claim 1.

6. A process of preparing oestrogenic compounds of general formula:

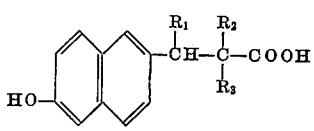

which comprises subjecting to dehydration an alcohol of the general formula:

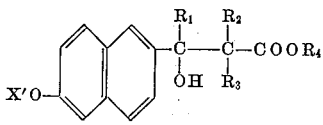

to form an ethylenic derivative of the general formula:

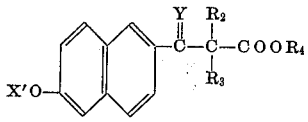

the letter Y in said general formulae representing an ethylenic residue of less than three carbon atoms, X', $R_1$, $R_2$, $R_3$ representing alkyl radicals of less than three carbon atoms and $R_4$ representing an alkyl radical, hydrogenating said ethylenic derivative, saponifying the ester group $COOR_4$ and dealkylating the group OX' into a OH group.

7. As new industrial products, acids of the general formula:

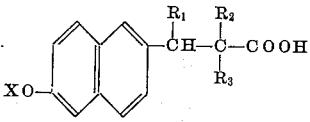

wherein the letter X represents a member of the group consisting of hydrogen and alkyl radicals of less than three carbon atoms, and $R_1$, $R_2$, $R_3$ represent alkyl radicals of less than three carbon atoms.

8. As a new industrial product, the [3-(6-hydroxy-2-naphthyl)] 2,2-dimethylpentanoic acid.

9. As a new industrial product, the [3-(6-methoxy - 2 - naphthyl)] 2,2-dimethylpentanoic acid.

ALAIN HOREAU.
JEAN JACQUES.

REFERENCES CITED

The following references are of record in the file of this patent:

UNITED STATES PATENTS

| Number | Name | Date |
|---|---|---|
| 2,193,674 | Haberland | Mar. 12, 1940 |

FOREIGN PATENTS

| Number | Country | Date |
|---|---|---|
| 700,982 | Germany | Dec. 5, 1940 |

OTHER REFERENCES

Haworth et al.: J. Chem. Soc., vol. 1934, pp. 864–867.

Bachman et al.: J. Am. Chem. Soc., vol. 68, pp. 2580–2581 (1946).

Kupchan et al.: Chem. Abstracts, vol. 40, cols. 3436–3437 (1946).

Horeau et al.: Compt. rend. (Fr. Acad. Sci.), vol. 222, pp. 1113–1115 (1946).

Houreau et al.: Compt. rend. (Fr. Acad. Sci.), vol. 224, pp. 862–864 (1947).